United States Patent [19]

Gillingham

[11] Patent Number: 4,500,332
[45] Date of Patent: Feb. 19, 1985

[54] THROUGHPUT BLADE FOR LOUVERED SEPARATORS

[75] Inventor: Gary R. Gillingham, Prior Lake, Minn.

[73] Assignee: Donaldson Company, Inc., Minneapolis, Minn.

[21] Appl. No.: 430,736

[22] Filed: Sep. 30, 1982

[51] Int. Cl.³ ............................................. B01D 45/00
[52] U.S. Cl. .............................. 55/443; 55/DIG. 37; 55/332; 55/482
[58] Field of Search ................ 55/320, 321, 323, 324, 55/331, 332, 336, 442, 443, DIG. 37, 482; 98/121 R, 121 A

[56] References Cited

U.S. PATENT DOCUMENTS

| | | | |
|---|---|---|---|
| 845,333 | 2/1907 | Carlson | 55/DIG. 37 |
| 2,787,334 | 4/1957 | Linderoth | 55/443 |
| 3,190,058 | 6/1965 | Farr et al. | |
| 3,342,024 | 9/1967 | Westlin | 55/443 |
| 3,378,994 | 4/1968 | Farr | 55/324 |
| 3,488,928 | 1/1970 | Tarala | 55/482 |
| 3,672,130 | 6/1972 | Sullivan et al. | 55/323 |

FOREIGN PATENT DOCUMENTS

| | | | |
|---|---|---|---|
| 1563990 | 3/1969 | France | |
| 2738521 | 3/1978 | France | 55/336 |
| 926358 | 5/1963 | United Kingdom | 55/442 |
| 929443 | 6/1963 | United Kingdom | 55/DIG. 37 |

Primary Examiner—Bernard Nozick
Attorney, Agent, or Firm—Merchant, Gould, Smith, Edell, Welter & Schmidt

[57] ABSTRACT

This application discloses an improved throughput blade design for louvered separators having a plurality of louvers (134). Each louver has a tab (144) extending perpendicularly from a central axis or plane (140). The optimum tap spacing S can be calculated with the knowledge of the blade angle B or the blade gap G. The tap height H is calculated as a function of the blade gap G. The tab (144) is designed to improve the efficiency the louver separator while making manufacture of the entire louvered array possible in one or two steps rather than necessitating manufacturer of each louver for later assembly.

8 Claims, 9 Drawing Figures

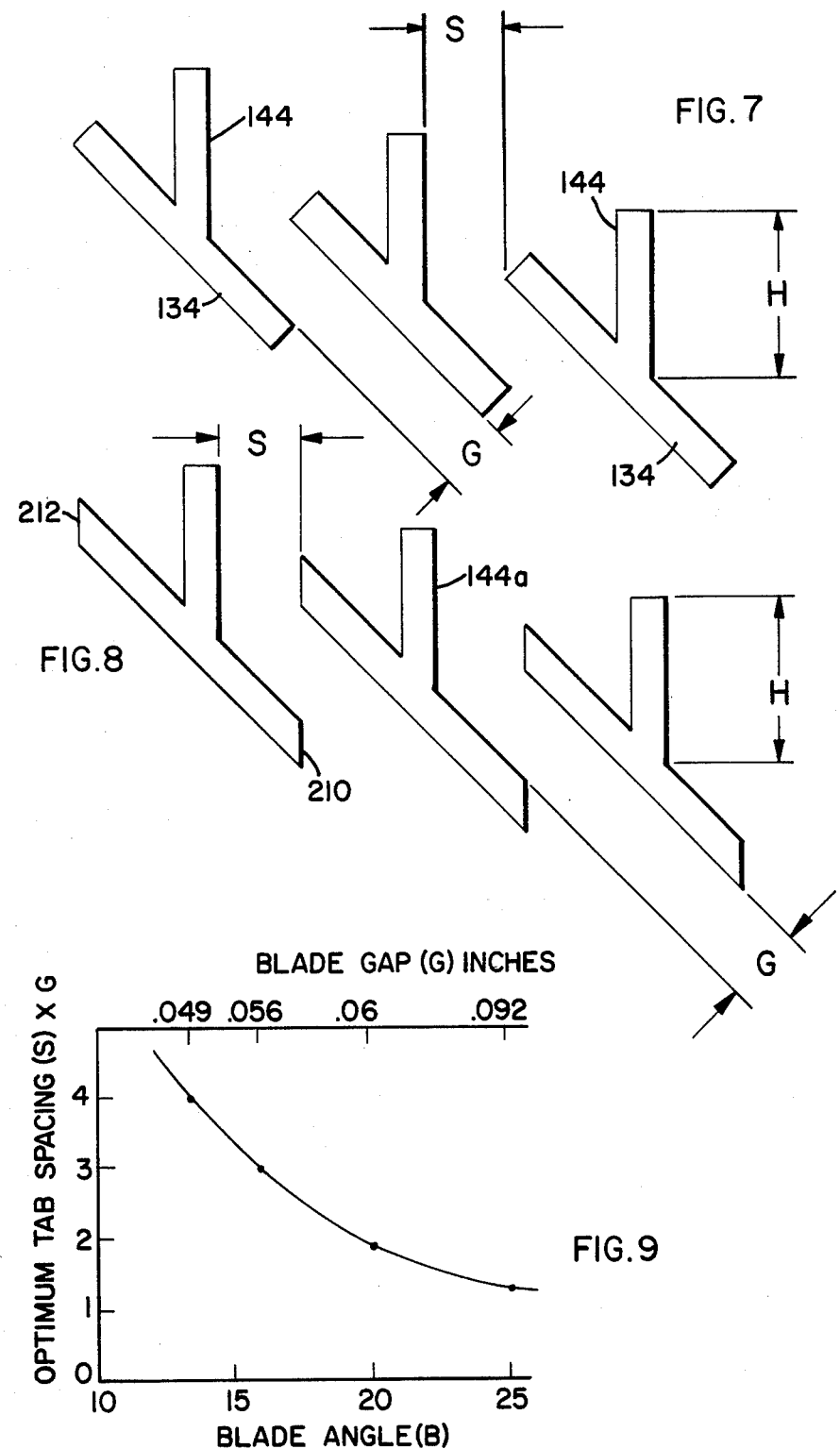

THROUGHPUT BLADE FOR LOUVERED SEPARATORS

TECHNICAL FIELD

The present invention relates to the field of air cleaners, more particularly pre-cleaner devices using a inertial separation by louvers.

BACKGROUND OF THE INVENTION

Louvered pre-cleaner separators have long been known in the art. They provide an effective filtering means which does not require periodic replacement. To improve the performance of such devices, it is desirable to provide a flange to the louver which will assist the filtered air passing through the louver to reverse direction toward the flow of pre-cleaned air. The flange helps to redirect this flow. Such a device is shown, for example, in U.S. Pat. No. 3,190,058 issued to Farr et al. Unfortunately, such a structure can be expensive to manufacture since each louvered section must be independently fabricated and then assembled. Furthermore certain blade constructions cannot be fabricated by injection molding because of their geometry. It would be desirable to produce a louvered pre-cleaner which had a redirecting flange which could be manufactured by injecting molding or the like permitting fabrication of the entire filter in one or two steps regardless of the number of louvered sections.

The present invention has overcome problems relating to non-unitary fabrication, thereby substantially increasing the practicability of louvered filters by reducing the cost of manufacture. Furthermore, the present invention optimizes the louvered construction to achieve superior performance while maintaining the advantages of high speed fabrication.

SUMMARY OF THE INVENTION

The present invention is in one embodiment directed to an air cleaner having a plurality of successive adjacent louvered sections together forming a sloped array of louvered sections being disposed with air passages between successive sections and having a tab member extending from the outer peripheral surface of each section the tab being oriented perpendicularly to a plane spaced from the array. According to another aspect of the invention, there is disclosed a conical shaped inertial air cleaner having a plurality of successive adjacent conical louvered sections in order of reducing diameter towards its scavenge (forwardmost) end, the sections being disposed with air passages between successive sections, and including a tab member extending from the outer peripheral surface of each section, tab being oriented perpendicularly to the central axis of the conical cleaner.

Other aspects of the invention relate to the location, inclination and length of various elements of the louver and tab.

Various advantages and features of novelty which characterize the invention are pointed out with particularity in the claims and which are annexed hereto. However, for better understanding of the invention, its advantages and objects, reference should be had to the drawings in the accompanying descriptive matter described in the preferred embodiment of the invention.

BRIEF DESCRIPTION OF THE DRAWINGS

The specific embodiments of the invention have been chosen for the purpose of illustration and description, and are shown in the accompanying drawings forming a part of the specification wherein:

FIG. 7 is close-up sectional view of a portion of louvers shown in FIG. 6 in one embodiment;

FIG. 8 is a view like FIG. 7 showing an alternate embodiment of the louvers; and FIG. 9 is a graph illustrating the relationship between various dimensions on the louvers.

DETAILED DESCRIPTION

I Description of the System in an Overall Environment

For the purpose of illustrating use and environment, an overall two-stage filter system is shown in FIGS. 1-5 and explained in detail hereinafter. The detailed description of the louvers as well as FIGS. 6 through 9 are discussed in the next section hereof.

Figure 1:
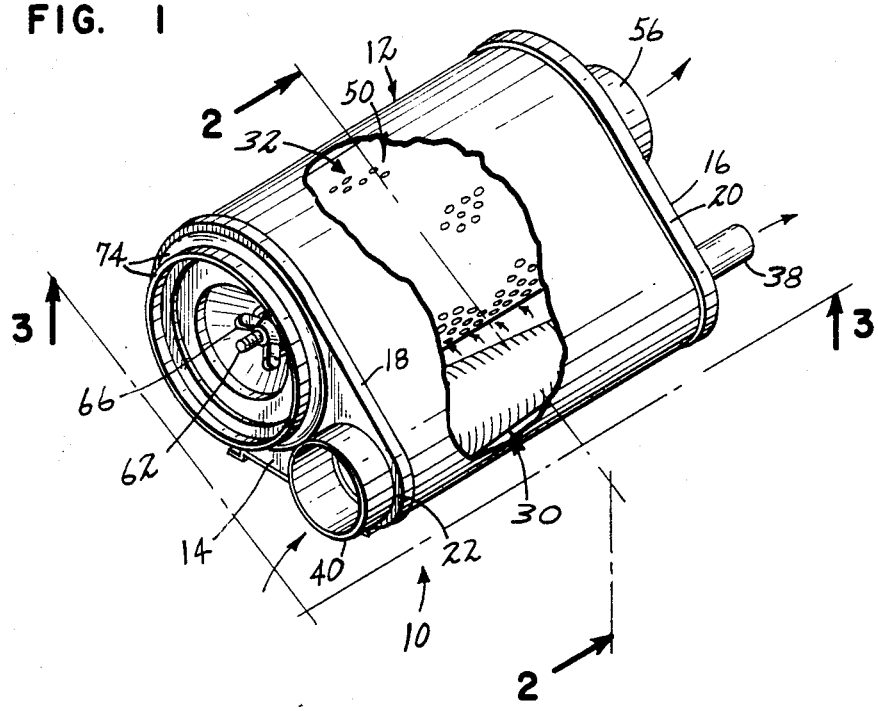
FIG. 1 is a perspective view of one embodiment with portions broken away of the present invention configured with a second filtered stage.
Figure 5:
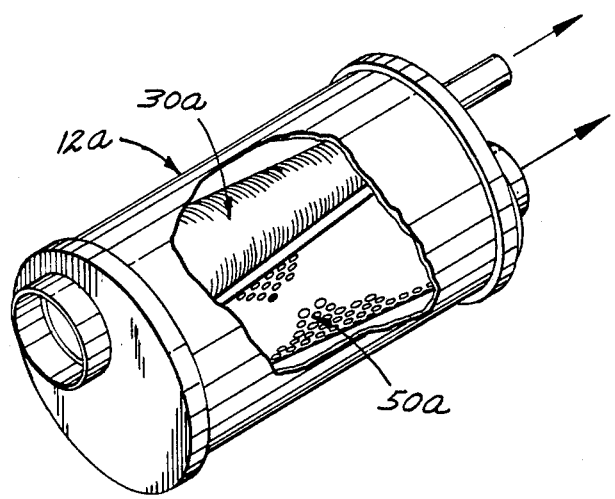
FIG. 5 is perspective view of a third embodiment with portions broken away of a filter system.

FIG. 1 discloses generally a preferred embodiment of the two-stage air cleaner 10 having an outer teardrop-shaped housing 12, preferably of metal, but in any case an air impervious material. Teardrop-shaped housing 12 is preferably formed in a shape as indicated in the FIGURE which could be described as a pair of opposed arcuate sections connected by straight, but not necessarily parallel, lines. The arcuate portions may be semicircular such as shown in FIG. 5, numeral 12A; however, they may also be elliptical or other forms, such as might be commonly used in an automobile muffler. The semicircular form, however, provides most efficient utilization of space. 16 and 14, each having a lip 18 and 20 extending perpendicularly from the outer periphery of the ends overriding member 12 thereby providing the basis for an airtight joint. Ends 14 and 16 may be welded or otherwise affixed to member 12 to provide an integral housing.

End 14 has two apertures, an air inlet 22 and an access 24. End 16 also has two apertures, 26 for a scavenge outlet, and 28 for a clean air outlet. These outlets are more clearly shown in FIG. 3.

Figure 2:
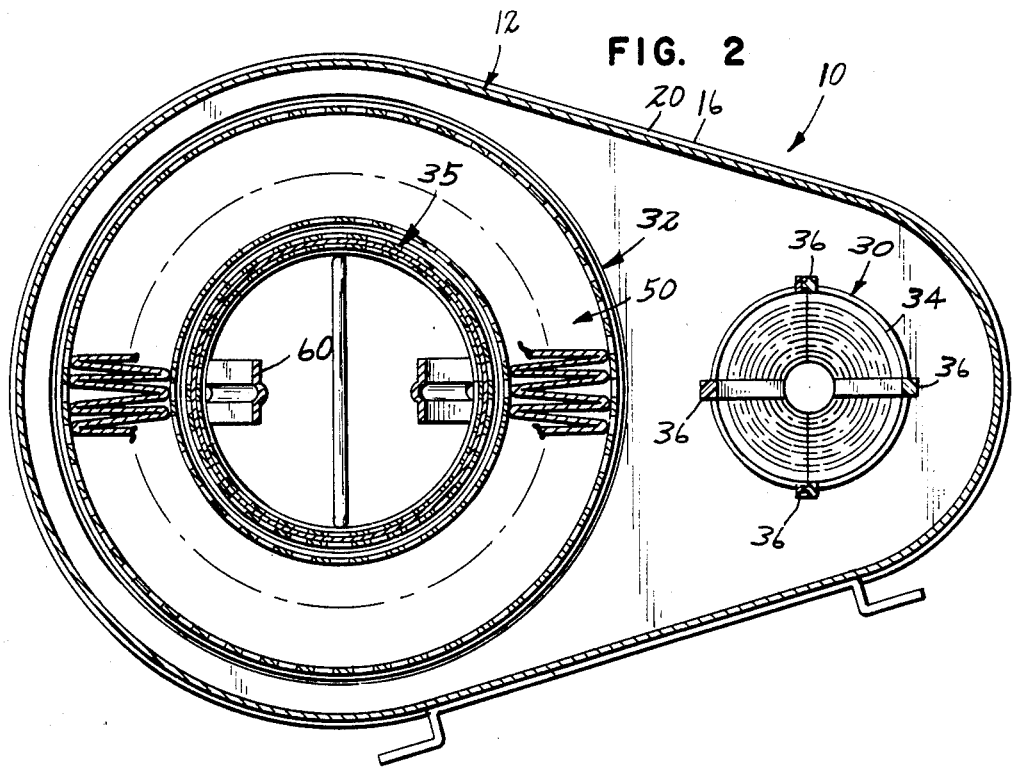
FIG. 2 is a sectional view taken along lines 2—2 of FIG. 1.
Figure 3:
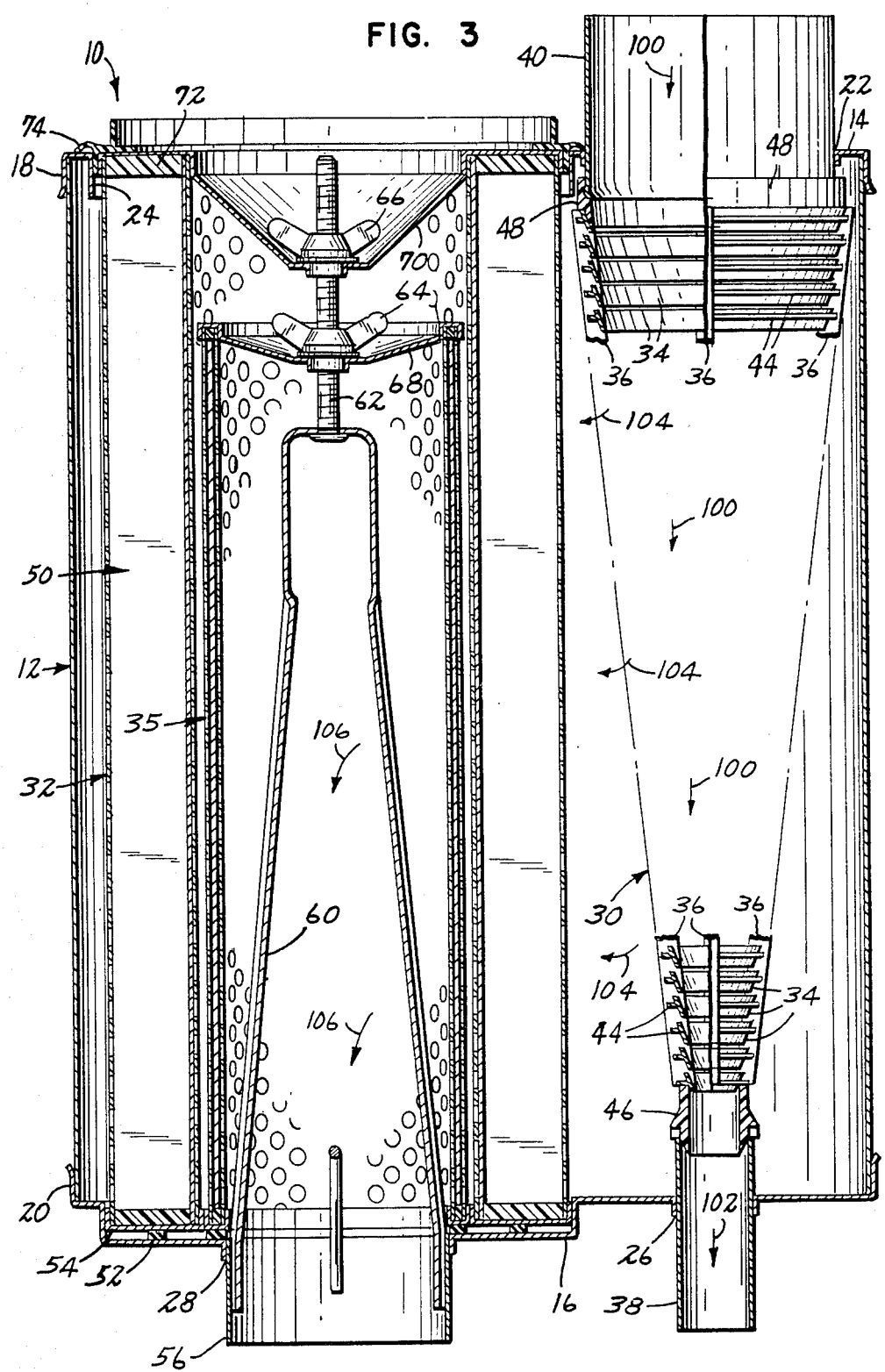
FIG. 3 is a sectional view taken along lines 3—3 of FIG. 1.

Turning to FIGS. 2 and 3, there can be seen the first stage element 30 and second element 32. In this embodiment, the second element includes a safety element 35.

The first cleaning element is as shown in FIG. 3, an inertial separator in the shape of a truncated cone. Element 30 may also be made of filter media. In the preferred embodiment, however, element 30 is comprised of a plurality of truncated conical elements 34 which are located adjacent its next preceding like element and held in place by a plurality of linear supports which extend from the scavenge outlet tube 38 to the inlet tube 40. In the preferred embodiment, there are four equally spaced support members 36 which are affixed to the conical elements 34 at their points of contact by adhesive or other means.

Although not shown in the drawings, it is possible to have a sock-like filter screen applied along the inside peripheral surface of the first cleaning member 30 for additional filtering.

Each conical element 34 is affixed on supports 36 adjacent but not in contact with neighboring elements. This provides a passage for air flow. Each conical element 34 preferably has a flange affixed to its outer periphery and extending outwardly therefrom. This flange 44 is preferably oriented orthogonally to the central axis of the first cleaner element 30, which is defined as extending through the cleaner from the inlet to the scavenger end. By providing this flange 44, the air flow is altered so as to maximize the inertial cleaning effect of the element and minimizing the pressure loss of the system. It is also preferable to locate flange 44 approximately midway between the leading and trailing edge of each conical element 34. The operation of inertial cleaning elements, also known as conical pocket dust louvers, is well-known in the prior art and will therefore not be explained herein.

The first and smallest conical element 34 rests upon support piece 46, which is preferably a resilient material. Support 46, in turn, is seated on scavenge tube 38 which may be welded to opening 26. The resilience of support 46 provides a compression fit of the cleaning element 30 between its inlet and scavenge ends. At the inlet end, the last and largest conical element 34 abuts a seating member 48 which, in turn, abuts inlet tube 40 which itself may be welded to opening 22 in the housing end.

Turning to the second stage of the filter system, the second cleaning element 32 preferably comprises a first cylindrically shaped pleated paper filter 50 of the type known in the prior art. In this embodiment, the filter is open at both ends and means are provided for sealing. It is also possible to provide a tubular filter 50 with one end sealed. Filter 50 preferably includes a resilient sealing member 52 at its end 54 which engages end 16 of the housing. Clean air opening 28 includes a tube 56 which is intended to be attached to the air intake on the engine or machine to be used. Extending from tube 56 is a yoke assembly 60 having a threaded bolt 62 and a pair of wing nuts 64 and 66 which compress a pair of end plates 68 and 70.

End plate 70 is adapted to provide an airtight seal of end 72 of filter 50. In a preferred embodiment, plate 70 may, in fact, be affixed to end 72 of the filter by adhesive and have sealing element 74 likewise there affixed. Seal 74 provides for an airtight fit between the filter 50 and end 14.

Removal of pleated filter 50 is accomplished by removing wing nut 66 and end plate 70, thus lifting the filter out of the housing. Notice that safety filter 35 located concentric with filter 50 remains over the outlet tube 56 to prevent contamination from entering the engine during filter replacement. In addition, note that the effectiveness of filter 50 is dependent only upon seals 52 and 74 located around the outlet tube, and end plate 70 or alternatively the sealed end of the cylindrical filter.

In operation, air enters inlet tube 40 as indicated by arrows 100. A portion of the air exits the scavenge tube at outlet 38, as indicated by arrow 102, carrying the heaviest particulate matter. The cleaner air, which contains smaller particulate matter having a low inertia, is drawn through the spaces between the louvers, or conical elements 34, as indicated by arrows 104. Air then enters pleated filter 50, collecting most of the remaining particulate matter in the filter media as it heads toward the central axis of the filter. As a final safeguard, the air must pass through safety filter 35 and into the outlet tube as indicated by arrows 106.

Figure 4:
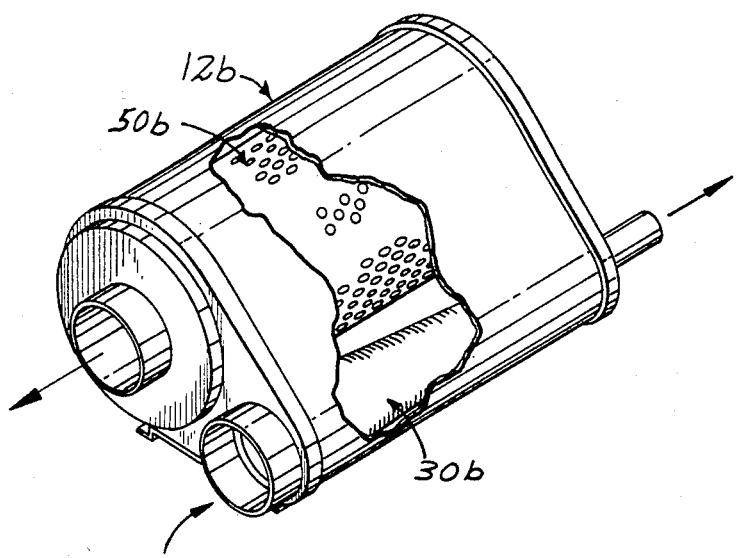
FIG. 4 is a perspective view of a second embodiment with portions broken away of a filter system.

As an alternative, in some installations, it is desirable to reverse the location of the outlet tube so as to be on the same end as the inlet tube as shown in FIG. 4, number 12b. The access 24 is then put on the opposite side; however, the operation is essentially unchanged.

ALTERNATIVE EMBODIMENT

FIG. 5 illustrates an alternative embodiment which may be employed to reduce the overall dimensions of the housing. To the extent elements of this embodiment are similar to the previous embodiment, they will not be reiterated. In FIG. 5, cylindrical housing 12a has a slightly different shape which is achieved by making the maximum diameter of the first cleaning element 30a equal to the maximum diameter of pleated filter 50a. Filter 50a is also formed in the shape of a truncated cone similar in shape to that of 30a, however, with a reverse taper so that both 50a and 30a can be brought into close relationship, thereby reducing the overall dimensions of the housing. With the filters as shown, cylindrical housing 12a appears to have the form of two arcuate members of equal size joined by curved lines. The arcuate members may be joined by straight lines, but if the diameters of the filters are small enough, the lines joining them will be curved.

DETAILED DESCRIPTION OF THE LOUVERED PRE-CLEANER

The cleaning element 30 shown in the earlier FIGURES has a conical shape which is desirable to maintain velocity within the interior of the cleaner throughout its length. As an alternative to a conical shape, a planar louver plate shown in cross-section FIG. 6, can be employed. The discussion of the embodiments shown in FIGS. 6–9 apply to both filters equally as the cross sections of both louvered configurations will be identical.

The problem enountered in prior art devices with respect to adding a tab to the louver is that manufacture of a tab which is not orthogonal to the parting line of an injection mold (or dye) cannot be successfully manufactured. If the tab is not orthogonal, removal of the injected part from the mold will cause destruction of the part. Of course, the louvers can be individually manufactured and then assembled into an array, however this method of manufacture dramatically increases the cost of the filtering device. The present invention provides a solution to this manufacturing dilemma and likewise optimizes the location of the tab and its associated spacing to achieve the maximum pre-cleaning effect.

It is also essential that adjacent blades never overlap, i.e. that any line extending perpendicularly from the central axis of plane (perpendicular to the tabs) will not intersect more than one louver at a time. Overlapping blades cannot be removed from an injection mold without damage to the blade.

Figure 6:
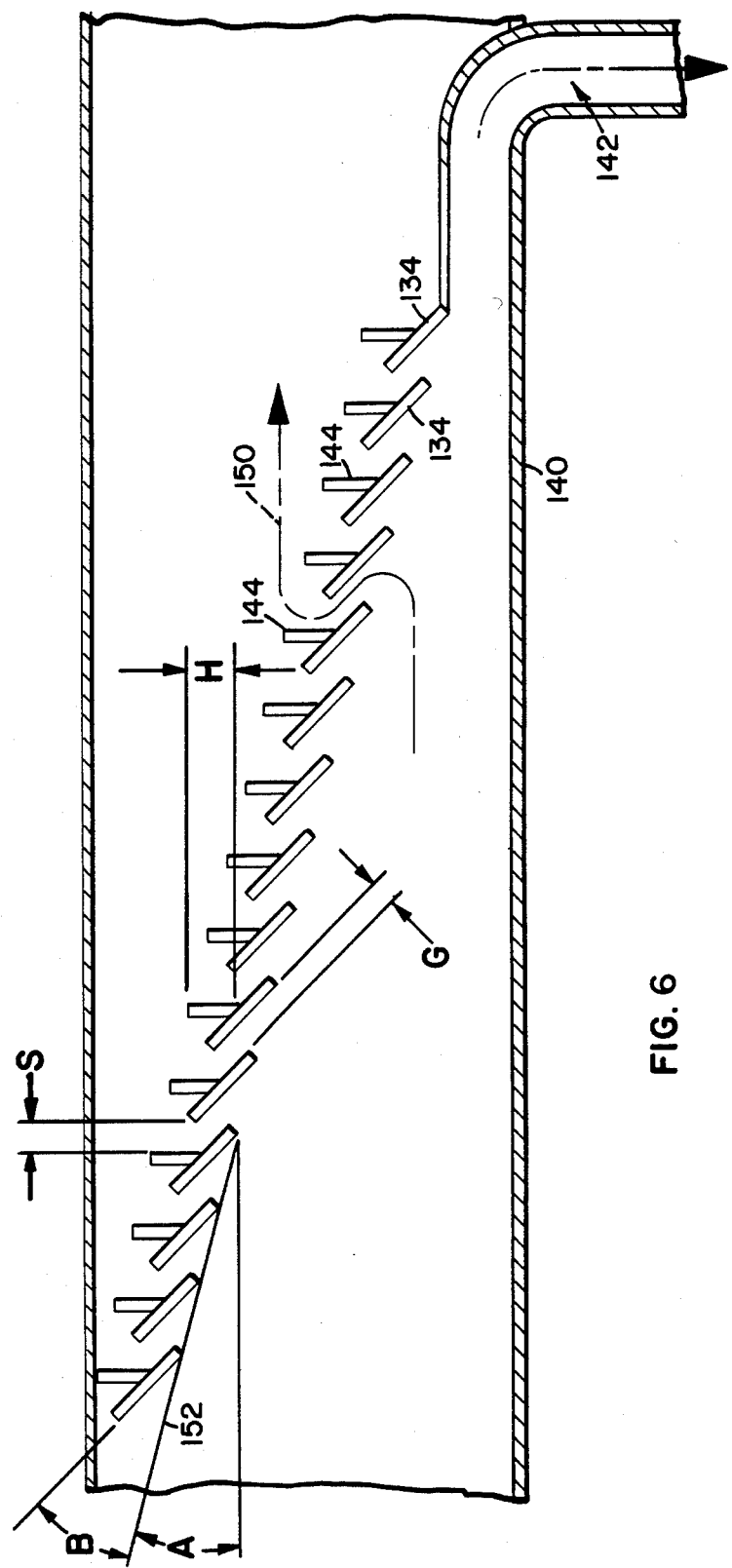
FIG. 6 is plan view in elevation of alternate embodiment of the present invention.

Turning to FIG. 6, there can be seen a plurality of louvered elements 134 formed into array which converges toward a planar member 140 at its scavenge end 142 (planar member 140 would be substituted by a planar axis of a conical element if louvers 134 were conical.) Extending outwardly from each louver element 134 are tabs 144.

The air flow through the filter is exemplified by the path shown by arrow 150. Notice that tab 144 redirects the flow of air into a forward direction after undergoing the direction reversal necessary for particulate separation.

Indicated in FIG. 6, is angle A referred to as the "array angle" which is measured between a plane (planar 140) which is preferably orthogonal to tabs 144 and a second plane which is drawn through a common point on each of louvers 134. In this case, the common line 152 is drawn, in FIG. 6, through common points at the outermost edge of the louver elements 134. Of course, any other point could be chosen on the louver and the line would be still parallel with line 152.

Another angle of importance, the "louver blade angle" B is the inclination of the louver off the plane passing through the common point in each of the louvers such as shown with line 152.

The louver gap G is defined as the distance between two successive louvers measured from the innermost surface of one louver to the outermost of the next succeeding louver measured along a line perpendicular to both louvers. Note that the blades must never overlap to be removable from the injection mold. If any plane drawn perpendicularly from the central axis does intersect more than one louver at a time, there is overlap.

The tab spacing S is defined as the distance as measured from the rearwardmost point on a louver (rearward being defined at the inlet side) to the tab of the next adjacent louver as measured along a line parallel to the central axis.

The relationship between the blade gap G, and optimum tab spacing S are illustrated in the graph on FIG. 9. Knowing the blade gap G, the optimum tab spacings can then be found on the graph.

Alternatively, the spacing can be calculated according to the following formula;

$$S = -0.20122 + 1.8295 * G + 0.14833/G$$

where G is the blade gap. It should be understood that both the graph in FIG. 9 and the above formula are approximations used to achieve the optimum tab spacing. Deviations from the optimum may achieve a desired result depending upon the degree of efficiency required.

The tab height H is measured orthogonally from plane 140 at its maximum length (from the point of origin on louver 134 to the uppermost point distant from the planar member). Tab height is approximately two times louver gap G for tab spacing (S) up to 3.5 times G. For larger tab spacings, a tab height of at least 3 times G is desirable.

FIG. 7 illustrates a close-up of tab 144 in FIG. 6 with the various angles and measurements denoted.

FIG. 8 illustrates an alternate embodiment of the tab 144 and has leading and trailing edges 210 and 212 respectively "beveled" such that they are orthogonal to the central axis of the filter in the case of conical filter or the equivalent of planar member 140.

While there is shown certain preferred embodiments, it will be understood that the same is capable of modification without departure form the scope and spirit of the invention as defined in the claims.

What is claimed is:

1. A conically shaped inertial air cleaner for use within a housing, said cleaner including wide inlet for unfiltered air and narrow outlet for more concentrated particulate laden air ends, a plurality of successive adjacent conical louvered members each having leading and trailing edges and being in order of descending diameter toward its narrow end, means attached to said members for maintaining them in an adjacent relationship, said members being disposed with air passages between successive members, a tab member extending from the outer peripheral surface of each section located between the leading and trailing edges, said tab being oriented perpendicularly to the central axis of the conical cleaner, and wherein said louvered members are located such that not more than one louvered member is intersected by any plane drawn perpendicularly through the central axis, wherein unfiltered air is passed through the cleaner from inlet to outlet ends and filtered air is drawn off passing between the louvered members.

2. An air cleaner according to claim 1 wherein each of said louvered sections has a rectangular cross-section.

3. An air cleaner according to claim 1 wherein each of said louvered sections has a cross-section in the shape of a parallelogram, with the shorter faces thereof being in a plane extending perpendicularly from said central axis.

4. An air cleaner according to claim 1 having a gap G between adjacent louvered sections as measured from the outer peripheral surface of one section to the inner peripheral surface of the next adjacent section along a line perpendicular to both surfaces, wherein the optimum tab spacing S as measured from the forwardmost edge of said tab to the rearmost edge of said louvered section along a line parallel to the central axis is determined by reference to the graph of FIG. 9 of the drawing.

5. An air cleaner according to claim 1 having a gap G between adjacent louvered sections as defined as the distance between two successive louvers measured from the innermost surface of one louver to the outermost of the other measured along a line perpendicular to both, wherein the optimum tab spacing S as measured from the forwardmost edge of said tab to the rearmost edge of said louvered section along a line parallel to the central axis is defined generally by the formula:

$$S = -0.20122 + 1.8295 * G + 0.14833/G \text{ (}G \text{ in inches)}.$$

6. An air cleaner according to claim 5 wherein the optimum tab height as measured along a line perpendicular to said central axis from the innermost to the outermost point on the tab as being generally twice G for tab spacings up to 3.5 times G.

7. An air cleaner according to claim 5 wherein the optimum tab height H as measured along a line perpendicular to said central axis from the innermost to the outermost point on the tab as being generally three times G for tab spacings S over 3.5 times G.

8. An inertial air cleaner for use within a housing, said cleaner including a wall and a plurality of successive adjacent louvered members spaced from the wall defining an inlet for unfiltered air between the wall and the members at one end and an outlet for more concentrated particulate laden air at the other end thereof, said members and said wall being closer to each other at the outlet than inlet, the louvered members each having leading and trailing edges and together forming a converging array converging toward an imaginary plane at the outlet end, means attached to said members for maintaining them in an adjacent relationship, said members being disposed with air passages between successive members, a tab member located intermediate said leading and trailing edges and extending from the outer peripheral surface of each member, said tab being oriented perpendicularly to the plane, wherein unfiltered air is passed between the space between the wall and the louvered members and filtered air passes between the louvered members and said tab member reducing the turbulence of filtered air.

* * * * *

UNITED STATES PATENT AND TRADEMARK OFFICE
CERTIFICATE OF CORRECTION

PATENT NO. : 4,500,332
DATED : February 19, 1985
INVENTOR(S) : Gary R. Gillingham It is certified that error appears in the above-identified patent and that said Letters Patent is hereby corrected as shown below:

bstract, line 9, insert "of" at the beginning of the line.

bstract, line 11, "manufacturer" should be --manufacture--.

olumn 2, line 16, after "is" insert therefore --a--.

olumn 2, line 18, after "is" insert therefore --a--.

olumn 2, line 20, after "is" insert therefore --a--.

olumn 2, line 47, before "16" insert --Ends--.

olumn 2, line 47, delete "having" and insert therefore --have--.

olumn 4, line 46, "enountered" should be --encountered--.

Signed and Sealed this

Tenth Day of September 1985

[SEAL]

Attest:

DONALD J. QUIGG

Attesting Officer   Acting Commissioner of Patents and Trademarks - Designate